(12) United States Patent
Zhang et al.

(10) Patent No.: US 9,629,169 B2
(45) Date of Patent: Apr. 18, 2017

(54) ACCESS POINT COORDINATION FOR TRAFFIC CONTROL IN WIRELESS NETWORKS

(71) Applicant: Marvell World Trade Ltd., St. Michael (BB)

(72) Inventors: Hongyuan Zhang, Fremont, CA (US); Yakun Sun, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 87 days.

(21) Appl. No.: 14/488,240

(22) Filed: Sep. 16, 2014

(65) Prior Publication Data

US 2015/0078353 A1  Mar. 19, 2015

Related U.S. Application Data

(60) Provisional application No. 61/878,309, filed on Sep. 16, 2013.

(51) Int. Cl.
| | | |
|---|---|---|
| *H04J 3/00* | (2006.01) | |
| *H04W 72/08* | (2009.01) | |
| *H04W 28/02* | (2009.01) | |
| *H04W 72/04* | (2009.01) | |
| *H04W 16/14* | (2009.01) | |

(Continued)

(52) U.S. Cl.
CPC ........ *H04W 72/082* (2013.01); *H04W 16/14* (2013.01); *H04W 28/0236* (2013.01); *H04W 72/0446* (2013.01); *H04W 74/0816* (2013.01); *H04W 84/12* (2013.01)

(58) Field of Classification Search
CPC ............ H04W 16/14; H04W 28/0236; H04W 72/0446; H04W 72/082; H04W 74/0816; H04W 84/12
USPC ......................... 370/328–329, 310–311, 336
See application file for complete search history.

(56) References Cited

U.S. PATENT DOCUMENTS

| 6,590,884 B1 | 7/2003 | Panasik |
| 7,599,332 B2 | 10/2009 | Zelst et al. |
| 7,742,390 B2 | 6/2010 | Mujtaba |

(Continued)

FOREIGN PATENT DOCUMENTS

| WO | WO-2009/084904 A2 | 7/2009 |
| WO | WO-2009/152852 A1 | 12/2009 |

(Continued)

OTHER PUBLICATIONS

Van Nee, et al. "The 802.11n MIMO-OFDM Standard for Wireless LAN and Beyond," Wireless Personal Communications, vol. 37, pp. 445-453 (Jun. 2006).

(Continued)

*Primary Examiner* — Khaled Kassim
*Assistant Examiner* — Berhanu Belete

(57) ABSTRACT

A presence of interference between a first wireless network and a second wireless network is determined. Transmissions in the first wireless network are coordinated with transmissions in the second wireless network to reduce interference between the first wireless network and the second wireless network. Transmissions in the first wireless network are scheduled based on the coordinating to reduce interference between the first wireless network and the second wireless network.

12 Claims, 8 Drawing Sheets

(51) Int. Cl.
H04W 84/12 (2009.01)
H04W 74/08 (2009.01)

(56) References Cited

U.S. PATENT DOCUMENTS

| | | | |
|---|---|---|---|
| 8,270,909 B2 | 9/2012 | Zhang et al. | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 9,325,540 B2 | 4/2016 | Zhang et al. | |
| 2005/0058151 A1* | 3/2005 | Yeh | H04W 52/46 370/445 |
| 2006/0067426 A1 | 3/2006 | Maltsev et al. | |
| 2007/0217455 A1* | 9/2007 | Haeusler | H04W 16/14 370/458 |
| 2007/0232235 A1 | 10/2007 | Li et al. | |
| 2008/0144493 A1* | 6/2008 | Yeh | H04W 52/50 370/230 |
| 2008/0240208 A1 | 10/2008 | Lou et al. | |
| 2009/0080579 A1 | 3/2009 | Fujii | |
| 2009/0196163 A1 | 8/2009 | Du | |
| 2009/0233554 A1* | 9/2009 | Cordeiro | H04B 7/0682 455/63.1 |
| 2009/0296649 A1* | 12/2009 | Yagi | H04L 5/0007 370/330 |
| 2010/0040033 A1* | 2/2010 | Xhafa | H04W 74/004 370/338 |
| 2010/0046358 A1 | 2/2010 | van Nee | |
| 2010/0091675 A1 | 4/2010 | Sawai | |
| 2010/0118837 A1* | 5/2010 | Bracha | H04W 56/00 370/336 |
| 2010/0233963 A1* | 9/2010 | Harada | H04W 16/14 455/63.3 |
| 2010/0278065 A1* | 11/2010 | Sun | H04W 52/0225 370/252 |
| 2010/0309834 A1 | 12/2010 | Fischer et al. | |
| 2011/0002219 A1 | 1/2011 | Kim et al. | |
| 2011/0110250 A1* | 5/2011 | Jeon | H04W 16/28 370/252 |
| 2011/0158115 A1* | 6/2011 | Sun | H04W 52/0274 370/252 |
| 2011/0188391 A1* | 8/2011 | Sella | H04W 24/10 370/252 |
| 2011/0223867 A1 | 9/2011 | Chae et al. | |
| 2011/0268217 A1 | 11/2011 | Gormley et al. | |
| 2011/0280226 A1* | 11/2011 | Lennvall | H04W 16/14 370/337 |
| 2011/0294514 A1* | 12/2011 | Kulkarni | H04W 72/0426 455/450 |
| 2011/0305156 A1 | 12/2011 | Liu et al. | |
| 2012/0028672 A1* | 2/2012 | Chen | H04W 52/241 455/522 |
| 2012/0034874 A1 | 2/2012 | Yiu et al. | |
| 2012/0039196 A1 | 2/2012 | Zhang | |
| 2012/0087265 A1 | 4/2012 | Tamaki et al. | |
| 2012/0113918 A1* | 5/2012 | Freda | H04W 16/14 370/329 |
| 2012/0149414 A1* | 6/2012 | Krishnaswamy | H04W 72/1215 455/507 |
| 2012/0263068 A1* | 10/2012 | Morimoto | H04W 24/10 370/252 |
| 2013/0035128 A1* | 2/2013 | Chan | H04W 72/085 455/513 |
| 2013/0053078 A1 | 2/2013 | Barbieri et al. | |
| 2013/0155931 A1* | 6/2013 | Prajapati | H04W 72/044 370/311 |
| 2014/0233416 A1* | 8/2014 | Black | H04W 72/085 370/252 |
| 2014/0241240 A1 | 8/2014 | Kloper et al. | |
| 2014/0256341 A1* | 9/2014 | Nayeb Nazar | H04W 72/082 455/452.1 |
| 2014/0302884 A1 | 10/2014 | Zhao et al. | |
| 2014/0334473 A1 | 11/2014 | Zhang et al. | |

FOREIGN PATENT DOCUMENTS

| | | |
|---|---|---|
| WO | WO-2012/156574 A1 | 11/2012 |
| WO | WO-2013/001968 A1 | 1/2013 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

IEEE Std 802.11h-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," The Institute of Electrical and Electronics Engineers, Inc., Oct. 14, 2003; 75 pages.

"Technical White Paper: Long Term Evolution (LTE): A Technical Overview", Motorola, 2007, 15 pages.

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.

3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), Dec. 2011, 125 pages.

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), Mar. 2012, 125 pages.

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010, 149 pages.

3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", Dec. 2010, 297 pages.

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.

3GPP TS 23.203 V10.6.0, "3rd Generation Partnership Project; Technical Specification Group Services and System Aspects; Policy and Charging Control Architecture (Release 10)", Mar. 2012, 131 pages.

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", Dec. 2011, 44 pages.

3GPP TS 36.300 V11.1.0, "3rd Generation Partnership Project; Technical Specification Group Radio Access Network; Evolved

(56) References Cited

OTHER PUBLICATIONS

Universal Terrestrial Radio Access (E-UTRA) and Evolved Universal Terrestrial Radio Access Network (E-UTRAN); Overall description; Stage 2 (Release 11)", Mar. 2012, 194 pages.
IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
IEEE Std 802.11ah™/D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
Abusubaih et al., "A Framework for Interference Mitigation in Multi-BSS 802.11 Wireless LANs," *IEEE International Symposium on a World of Wireless, Mobile and Multimedia Neworks & Workshops*, pp. 1-11 (Jun. 15, 2009).
Bejerano et al., "MiFi: A Framework for Fairness and QoS Assurance for Current IEEE 802.11 Networks with Multiple Access Points," *IEEE/ACM Transactions on Networking*, vol. 14, No. 4, pp. 849-862 (Aug. 2006).
Chen, "Home Network Basis: Transmission Environments and Wired/Wireless Protocols," *Prentice Hall*, pp. 1-26 (Jul. 2003).
Hiertz et al., "The IEEE 802.11 Universe," *IEEE Communications Magazine*, pp. 62-70, (Jan. 2010).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Zheng et al., "Overlapping Impacts and Resource Coordination for High-Density Wireless Communication," *International Conference on Computing and Communication Technologies*, 8 pages (Jul. 13, 2009).
International Search Report and Written Opinion in International Application No. PCT/US2014/055900, mailed Mar. 26, 2015 (13 pages).
International Preliminary Report on Patentability in International Application No. PCT/US2014/055900, mailed Mar. 31, 2016 (9 pages).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.
Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).
Catreux et al., "Attainable Throughput of an Interference-Limited Multiple-Input Multiple-Output (MIMO) Cellular System," IEEE Trans. Communications, vol. 49, No. 8, pp. 479-493, Aug. 2001.
IEEE Std 802.11h™-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," The Institute of Electrical and Electronics Engineers, Inc., Oct. 14, 2003; 75 pages.
Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.
Love et al., "An Overview of Limited Feedback in Wireless Communication Systems," IEEE J. on Selected Areas in Communications, vo. 26, No. 8, pp. 1341-1365 (Oct. 2008).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LANMedium Access Control (MAC) and Physical Layer (PHY) specifications, the Institute of Electrical and Electronics Engineers, Inc., (Mar. 29, 2012).
Zhang et al., "Beamforming Feedback for Single Stream," The Institute of Electrical and Electronics Engineers, doc. No. IEEE 802.11-12/1312r0, pp. 1-22 (Nov. 12, 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

\* cited by examiner

ACCESS POINT COORDINATION FOR TRAFFIC CONTROL IN WIRELESS NETWORKS

CROSS-REFERENCES TO RELATED APPLICATIONS

This disclosure claims the benefit under 35 U.S.C. §119(e) of the U.S. Provisional Patent Application No. 61/878,309, entitled "Access Point Coordination for Traffic Control," filed on Sep. 16, 2013, the disclosure of which is hereby incorporated by reference herein in its entirety.

FIELD OF THE DISCLOSURE

The present disclosure relates generally to communication systems and, more particularly to reducing co-channel interference in wireless networks.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput. Efforts are underway for development of post 11ac WLAN having higher spectrum efficiency, called "high efficiency Wi-Fi (HEW), utilizing the 2.4 GHz and 5 GHz bands.

SUMMARY

At least some embodiments disclosed herein mitigate problems associated with co-channel interference that may arise in densely deployed wireless networks.

In an embodiment, a method for reducing interference in wireless communications is disclosed, the method including: determining, by a communication device of or communicatively coupled to a first wireless network, a presence of interference between the first wireless network and a second wireless network; coordinating, with the first communication device, transmissions in the first wireless network with transmissions in the second wireless network to reduce interference between the first wireless network and the second wireless network; and scheduling, at a first access point, transmissions in the first wireless network, based on the coordinating to reduce interference between the first wireless network and the second wireless network.

In a further embodiment, an apparatus is disclosed, the apparatus including one or more integrated circuit devices configured to: determine a presence of interference between a first wireless network and a second wireless network, coordinate transmissions in the first wireless network with transmissions in the second wireless network to reduce interference between the first wireless network and the second wireless network, and schedule transmissions in the first wireless network, based on the coordinating to reduce interference between the first wireless network and the second wireless network.

In a further embodiment, a non-transitory computer readable storage medium is disclosed, the non-transitory computer readable storage medium having computer program instructions stored thereon that, when executed by one or more processors, cause the one or more processors to: determine a presence of interference between a first wireless network and a second wireless network; coordinate transmissions in the first wireless network with transmissions in the second wireless network to reduce interference between the first wireless network and the second wireless network; and schedule transmissions in the first wireless network, based on the coordinating to reduce interference between the first wireless network and the second wireless network.

BRIEF DESCRIPTION OF THE DRAWINGS

Like reference symbols in the various drawings indicate like elements.

DETAILED DESCRIPTION

In various embodiments described below, a first communication device (e.g., an access point) in a first wireless network coordinates transmissions within the first network with transmissions within a second wireless network so as to avoid interference with the second wireless network.

Figure 1:
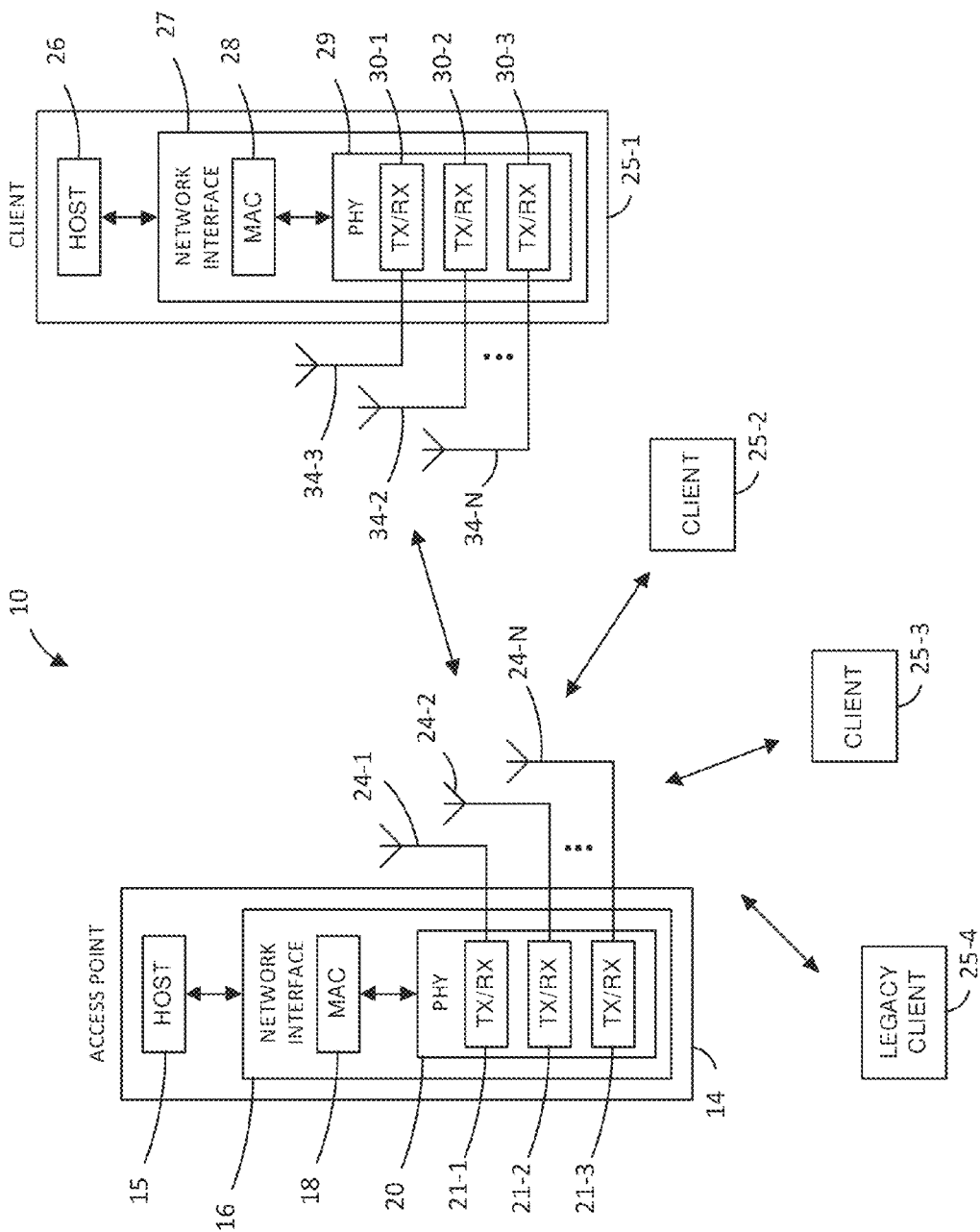
FIG. 1 is a block diagram of an example wireless local area network (WLAN) communication system in which an access point (AP) uses interference mitigation techniques, according to an embodiment.

FIG. 1 is a block diagram of an example WLAN 10 in which devices such as an access point (AP) 14 and client devices 25 exchange information using Orthogonal Frequency-Division Multiplexing (OFDM) techniques in a multiple input, multiple output (MIMO) mode, according to an embodiment. The AP 14 includes a host processor 15 coupled to a network interface 16. The network interface 16 includes a medium access control (MAC) processing unit 18 and a physical layer processing unit 20. The PHY processing unit 20 includes a plurality of transceivers 21, and the transceivers are coupled to N antennas 24, where N is a suitable positive integer.

In FIG. 1, the AP 14 has the same number of transceivers 21 as antennas 24, but in other embodiments, the AP 14 may include a different number of transceivers 21 than antennas 24 (e.g., there may be more antennas than transceivers and antenna switching techniques may be utilized). In FIG. 1, three transceivers 21 and three antennas 24 are illustrated, but in other embodiments, the AP 14 may include different suitable numbers of transceivers 21 and antennas 24 (e.g., 1, 2, 4, 5, 6, 8, etc.). In one embodiment, the MAC processing unit 18 and the PHY processing unit 20 may be configured to operate according to a communication protocol generally similar to the IEEE 802.11n Standard and/or the IEEE 802.11ac Standard, for example. In other embodiments, other suitable communications protocols may be utilized.

The network interface device 16 (e.g., the MAC processing unit 18 and/or the PHY processing unit 20) may be configured to perform access point coordination procedures with client devices 25, as described below, in some embodiments.

A client device 25-1 may include a host processor 26 coupled to a network interface 27. The network interface 27 may include a MAC processing unit 28 and a PHY processing unit 29. The PHY processing unit 29 includes a plurality of transceivers 30, and the transceivers are coupled to a plurality of antennas 34. Although the same number of transceivers 30 and antennas 34 are illustrated in FIG. 1, the client device 25-1 may include different numbers of transceivers 30 and antennas 34, in other embodiments. Although three transceivers 30 and three antennas 34 are illustrated in FIG. 1, the client device 25-1 may include different suitable numbers (e.g., 1, 2, 4, 5, etc.) of transceivers 30 and antennas 34 in other embodiments. The transceiver(s) 30 is/are configured to transmit generated data streams via the antenna(s) 34. Similarly, the transceiver(s) 30 is/are configured to receive data streams via the antenna(s) 34.

In an embodiment, one or both of the client devices 25-2 and 25-3 have a structure the same as or similar to the client device 25-1. In these embodiments, the client devices 25 structured like the client device 25-1 have the same or a different number of transceivers and antennas. For example, the client device 25-2 may have only two transceivers and two antennas, according to an embodiment.

In an embodiment, the WLAN 10 may also include one or more legacy client devices 25-4 that operate according to a legacy communications protocol.

Figure 2:
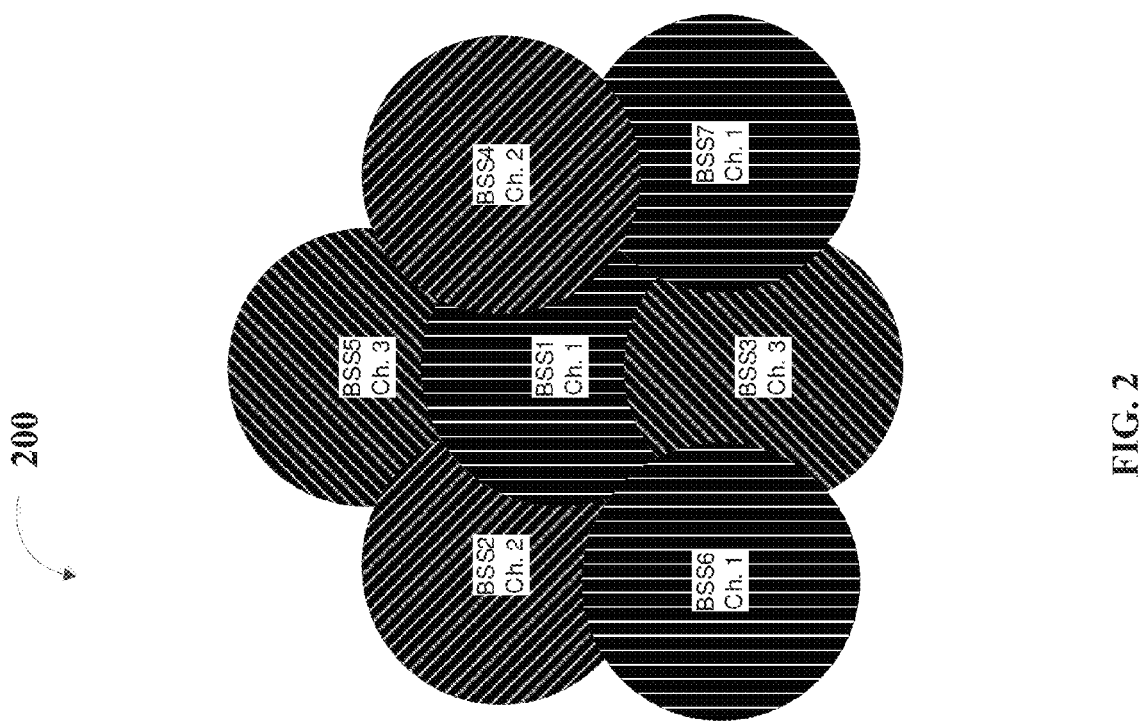
FIG. 2 is a block diagram of an example communication system in which a plurality of APs have overlapping service areas and use coordinated access point scheduling to mitigate interference, according to an embodiment.

FIG. 2 is a block diagram of an environment 200 in which multiple APs are operating, each AP corresponding to a different WLAN, according to an embodiment. Each WLAN is a Basic Service Set (BSS) that includes an AP and one or more client devices such as client devices 25 discussed above with reference to FIG. 1, according to an embodiment.

There are seven regions labeled BSS1, BSS2 . . . BSS7 illustrated in FIG. 2. Each region represents a BSS whose transmissions may overlap or interfere with transmissions of one or more other BSSs. For example, BSS1 has a service that partially overlaps with each of BSS2, BSS3 . . . BSS7. In other words, a data packet transmitted from an AP or one of the client devices in BSS1 may be received by an AP or one of the client devices in one or more of BSS1, BSS2 . . . BSS7. As shown in FIG. 2, for example, BSS1 has a large overlap with BSS2 but a much smaller overlap, for example, with BSS7. Thus a transmission from BSS1 is more likely to be received by one or more devices in BSS2 than it is to be received by one or more devices in BSS7, for example. The example of FIG. 2 illustrating seven BSSs having overlapping service areas is presented merely for illustration. Other embodiments may include greater or fewer numbers of BSSs having overlapping service regions.

While the service area of BSS1 overlaps with six other BSS service areas (i.e., with BSS2, BSS3 . . . BSS7), some BSSs, such as BSS2, may overlap with service areas of fewer BSSs. For example, the service area for BSS2 has overlap, for example, only with the service areas of BSS1, BSS3, and BSS6. Thus, while transmissions in BSS2 may be received in BSS1, BSS3, and BSS6, transmission in BSS2 are less likely to be received, for example, in BSS3, BSS4, and BSS7, for example, where there is little or no overlap of the respective service areas.

The plurality of BSS service areas illustrated in FIG. 2 represents an example of a densely deployed WLAN. Such a system may experience co-channel interference (CCI). In systems that employ the 2.4 frequency GHz band, for example, there may be only three 20 MHz channels available for communications within a given BSS. As such, overlapping BSS service areas (OBSS) may experience CCI if two or more overlapping BSS service areas are utilizing a common frequency channel.

FIG. 2 illustrates an example OBSS 200 in which CCI may occur between two or more overlapping BSS service areas that operate using a common frequency channel. For example, as mentioned above, a system operating using the 2.4 GHz band may have only three frequency channels available, according to an embodiment. Merely for the purpose of illustration, the three available channels in such an embodiment will be referred to by the numbers 1, 2, 3 in the following discussion. In the example of FIG. 2, service areas labeled BSS1, BSS6, and BSS7 each may operate according to channel 1, as indicated. Service areas labeled BSS2 and BSS4 each may operate according to channel 2, as indicated. Lastly, service areas labeled BSS3 and BSS5 may operate according to channel 3, as indicated.

In the example of FIG. 2, the greatest likelihood for CCI may occur between BSS1, BSS6, and BSS7. This may occur because the service region of BSS1 overlaps with the service regions both BSS6 and with BSS7, and because each of regions BSS1, BSS6, and BSS7 operate using channel 1. Thus, a transmission in BSS1 may cause CCI in BSS6 and BSS7, for example. Likewise, a transmission in BSS6 may cause CCI in BSS1 and BSS7, while a transmission in BSS7 may cause CCI in BSS1 and BSS6.

In contrast, transmissions in BSS1 are less likely to cause CCI with regions BSS2 and BSS4 because, although the service areas of BSS1, BSS2, and BSS4 overlap, the three BSSs operate using different channels, with BSS1 operating according to channel 1, while BSS2 and BSS4 operate according to channel 2. Similarly, transmissions in BSS1 are less likely to cause CCI with BSS3 and BSS5 because, although the service areas of BSS1, BSS3, and BSS5 overlap, they operate using different channels, with BSS1 operating according to channel 1, while BSS3 and BSS5 operate utilizing channel 3.

In another example, transmissions in BSS6 may cause CCI with BSS1 because BSS6 and BSS1 overlap and both operate according to channel 1. In contrast, transmissions in BSS6 are less likely to cause CCI in BSS2 and BSS3 because, although BSS6 overlaps with both BSS2 and BSS3, BSS6 operates according to channel 1, while BSS2 and BSS3 operate according to channel 3. Similarly, although BSS6 shares the same operating channel with BSS7 (i.e., channel 1), it is less likely that a transmission in BSS6 will cause CCI in BSS7, and vice versa, because the service areas of BSS6 and BSS7 do not overlap.

To summarize, in densely deployed Wi-Fi, the greatest chance of CCI occurs between OBSS in which two or more BSS overlap and share a common frequency channel. When CCI occurs, errors may occur when the strength of the interfering signals are sufficiently strong. In such an occurrence, collisions may occur involving unicast packets (e.g., data frames) as well as broadcast packets (e.g., management/control frames), for example.

When a collision involving a unicast packet occurs, transmission is blocked for a certain period of time. For example, a unicast packet from BSS1 may be accidentally received by the AP or a client device in BSS6. The reception of the unicast packet transmitted from BSS1 and received by BSS6 causes delays in BSS6. For example, the unicast packet received by BSS6 may trigger Clear Channel Assessment (CCA) procedures to be performed by devices in BSS6. This reception may also trigger decoding at the layer PHY layer. In turn, processing may continue at the MAC level. When the packet is processed at the MAC level the mismatch of the MAC address may be revealed. At such point it may be discovered CCI has occurred. In any case, the processing of the incorrectly received packet causes CCA to continue to hold the media until the end of the packet has been processed. Thus, transmission in BSS6 may be incorrectly blocked due to the processing of an incorrectly received unicast packet from BSS1, for example.

Similar delays may occur due to CCI involving broadcast packets. For example, a broadcast packet transmitted by BSS1 may be incorrectly received in BSS6 due to CCI between BSS1 and BSS6 if the CCI between BSS1 and BSS6 is sufficiently strong. In such an occurrence, processing of management frames may continue at the MAC level until the end of the packet is reached. In such an occurrence, the device processing the broadcast packet may set a Network Allocation Vector (NAV) that blocks its own transmission for a specified time duration.

The present disclosure provides embodiments that enable coordination of traffic in OBSS so that CCI collisions can be avoided or at least reduced in number as compared to prior art OBSSs. For example, mechanisms may be provided so that an AP in a first BSS can detect interference from one or more neighboring BSSs. For example, with reference to FIG. 2, BSS1 may be provided with systems and methods for detecting the presence of CCI caused by BSS6 and BSS7.

As an example, the AP in BSS1 or a client device in BSS1 may receive a transmission of a unicast or broadcast packet from, say, BSS6. The packet that was received by a device in BSS1 contains information regarding the sender (i.e., a device in BSS6) as well as information regarding the intended receiver (i.e., one or more devices in BSS6). In addition, the strength of the signal representing the packet received from BSS6 may be determined. In an embodiment, if the packet from BSS6 was received by a station in BSS1, the station may report receipt of the packet and information regarding a level of interference to BSS1 caused by the packet, such as a strength of the signal related to the packet. From information such as (i) the BSS corresponding to the packet (e.g., BSS6) and (ii) an indication of a level of interference in BSS1 caused by the packet, the AP in BSS1 may determine the degree to which CCI caused by BSS6 represents a source of interference in BSS1. For example, CCI from BSS6 may be determined to be sufficiently weak as to not represent a significant source of interference in BSS1. As such, CCI from BSS6 may be ignored.

In contrast, however, it may be determined that CCI from BSS6 may represent a significant source of interference in BSS1, for example due to collisions of data packets, as discussed above. In addition, the AP in a given BSS may determine the presence of significant CCI from a plurality of neighboring BSS. Returning to FIG. 2, for example, BSS1 may determine that two or more neighboring BSS (e.g., BSS6 and BSS7) represent a significant source of interference due to CCI. For example, CCI may result between BSS6 and BSS1 as well as between BSS7 and BSS1.

According to disclosed embodiments, once significant CCI is detected by an AP of a given BSS (e.g., the AP in BSS1) a method to avoid collisions (e.g., packet collisions between BSS6 and BSS1, and packet collisions between BSS7 and BSS1) can be employed. For example, by communication between the AP's of BSS1, BSS6, and BSS7, traffic in the respective networks can be coordinated so that CCI can be minimized.

In an embodiment, determining that interference from another BSS is significant comprises determining that a metric associated with interference from the other BSS meets a threshold level. For example, in an embodiment, determining that interference from another BSS is significant comprises determining that a signal level of a packet from the other BSS meets a threshold level. As another example, in an embodiment, determining that interference from another BSS is significant comprises determining that a rate of collisions with packets from the other BSS meets a threshold level. In other embodiments, other suitable metrics are utilized.

Figure 3:
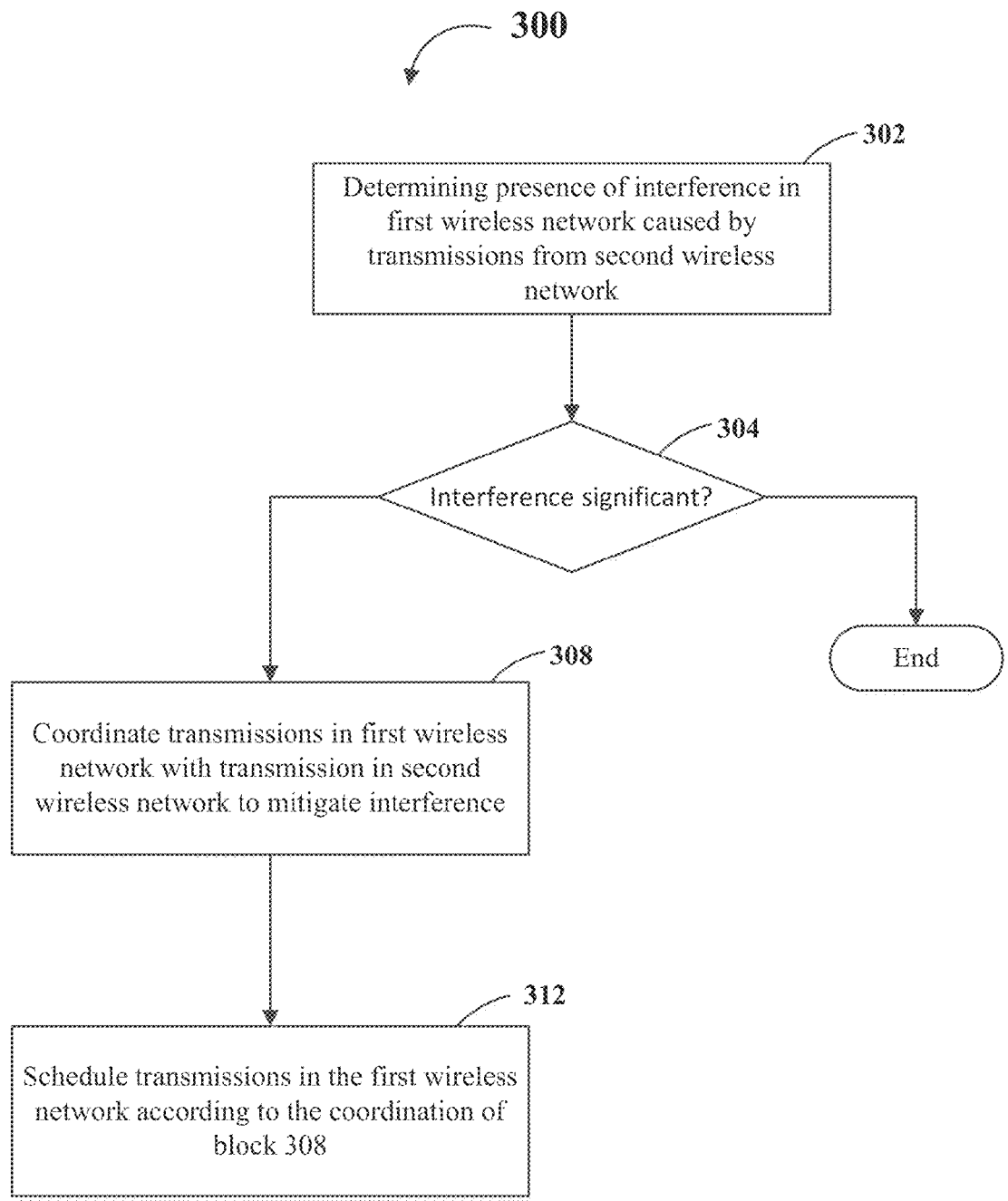
FIG. 3 is a flow diagram of an example method for reducing interference in wireless communications involving two or more communications systems having overlapping service areas, according to an embodiment.

FIG. 3 illustrates a flow diagram of an example method 300 for reducing interference in wireless communications involving two or more OBSS, according to an embodiment. The method 300 may be implemented by one or more communication devices in (or communicatively coupled to) the example wireless local area network 10 described with reference to FIG. 1. For example, the method 300 may be implemented by the AP 14, e.g., by one of or any suitable combination of two or more of (i) the host processor 15, the network interface 16, the MAC processing device 18, and/or the PHY processing device 20, according to various embodiments. In some embodiments, the method may be implemented at least partially (e.g., alone or in combination with the AP 14) by the client device 25-1, e.g., by one of or any suitable combination of two or more of (i) the host processor 26, the network interface 27, the MAC processing device 28, and/or the PHY processing device 29, according to various embodiments. The method 300 is discussed with reference to local area network 10 (FIG. 1) and/or with OBSS 200 (FIG. 2) merely for explanatory purposes. In other embodiments, the method 300 may be implemented by another suitable apparatus and/or system, and/or in the context of another suitable OBSS.

At block 302, a communication device (e.g., a first AP) of a first wireless network determines a presence of interference between the first wireless network and a second wireless network. This may be accomplished, for example, based on receipt of a transmission from the second wireless network by the AP of the first BSS or by a client device in the first BSS. For example, a station (STA) within the first network may receive a transmission from one or more devices in the second network. The receiving STA within the first network may then send a report to the AP of the first network informing the AP of the origin of the interfering signal as well as a measured metric associated with a level of interference caused by the interfering signal (e.g., signal strength, rate of collisions, etc.), according to an embodiment. As another example, the receiving STA may determine whether interference caused by the signal is significant (e.g., according to techniques described above, in some embodiments), and report reception of the signal to the first AP only when the STA determines that the interference was significant. In some embodiments, the first AP may directly receive the interfering signal and determine a level of interference caused by the interfering signal.

At block 304, it is determined whether interference caused by transmissions from the second network is significant. In an embodiment, determining that interference from the second network is significant comprises determining that a metric associated with interference from the second network meets a threshold level. For example, in an embodiment, determining that interference from the second network is significant comprises determining that a signal level of a packet from the second network meets a threshold level. As another example, in an embodiment, determining that interference from the second network is significant comprises determining that a rate of collisions with packets from the second network meets a threshold level. In other embodiments, other suitable metrics are utilized.

In some embodiments, the first AP determines whether the interference is significant. For example, in some embodiments, the first AP compares a metric indicating a level of interference to a threshold. As another example, in some embodiments, the first AP determines that interference is significant when the first AP receives a report of interference from a STA in the first wireless network, and the first AP assumes that the STA only reports such interference when the STA determines the interference is significant. In some embodiments, a STA in the first wireless network determines whether the interference is significant, and informs the STA that the interference is significant.

If it is determined at block 304 that interference caused by transmissions from the second network is not significant, the flow ends. On the other hand, if it is determined at block 304 that interference caused by transmissions from the second network is significant, the flow proceeds to block 308.

At block 308, a communication device (e.g., the first AP) of the first network may coordinate transmissions in the first wireless network with transmissions in the second wireless network to reduce interference between the first wireless network and the second wireless network. For example, coordinating transmissions in the first wireless network with transmissions in the second wireless network may include determining first time slots in which transmissions in the first wireless network are to occur and in which transmissions in the second wireless network are not to occur, according to an embodiment. Similarly, coordinating transmissions in the first wireless network with transmissions in the second wireless network may include determining second time slots in which transmissions in the second wireless network are to occur and in which transmissions in the first wireless network are not to occur, according to an embodiment. Block 308 may include the first AP communicating with a second AP of the second network to coordinate transmissions, in some embodiments. Block 308 may include the first AP communicating with a second AP of the second network to exchange information regarding first time slots as discussed above, in some embodiments. Block 308 may include the first AP communicating with a second AP of the second network to exchange information regarding second time slots as discussed above, in some embodiments.

At block 312, the AP of the first network may schedule transmissions in the first wireless network, based on the coordinating of block 308 in order to reduce interference between the first wireless network and the second wireless network. For example, in some embodiments, transmissions within the first network may be scheduled to occur during the first time slots discussed above. Similarly, in some embodiments, transmissions within the first network may be scheduled to not occur during the second time slots. In some embodiments, transmissions within the first network may be scheduled to not occur during the second time slots, but the first network may operate normally according to a communication protocol during the first time slots.

Figure 4:
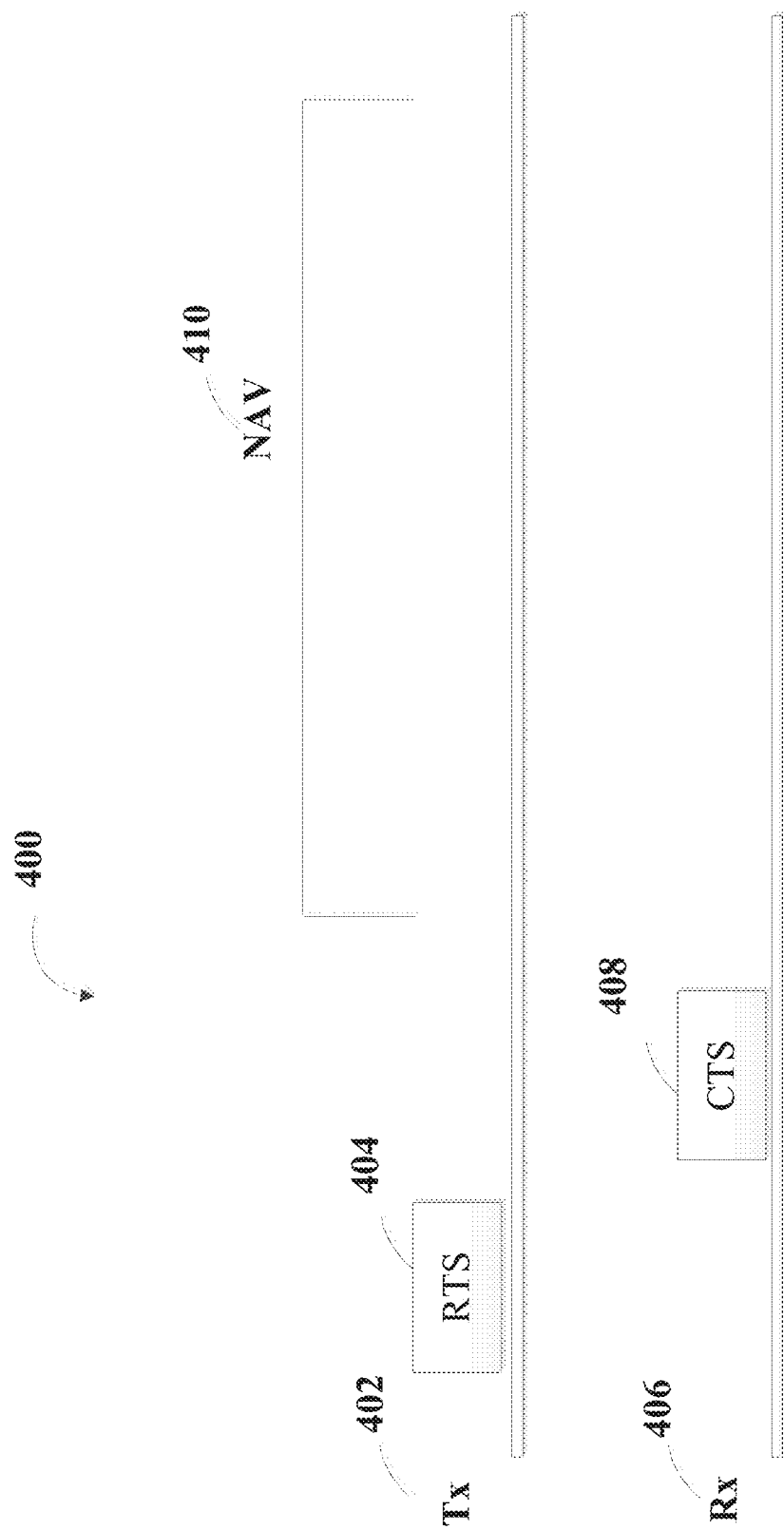
FIG. 4 is a timing diagram illustrating an example request-to-send (RTS)/clear-to-send (CTS) exchange that may be used to suppress transmissions in a first wireless network to reduce interference in a second wireless network, according to an embodiment.

During the first time slots, transmissions within the first wireless network may be scheduled based on transmit opportunity (TxOP) periods. FIG. 4 illustrates an example TxOP 400 that may be used to schedule transmission within the first wireless network, during times when there are no transmissions in the second network, according to an embodiment. For example, a first STA 402 (labeled Tx) may send a request-to-send (RTS) packet 404 to a receiving STA 406 (labeled Rx). The receiving STA 406 may send a clear-to-send (CTS) packet 408 back to the sending STA 402 indicating that the receiving STA 406 is clear to receive data 410 from the sending STA 402. Next, during a time duration given by a NAV 412, data 408 may be transmitted from the transmitting STA 402 to the receiving STA 406.

According to this protocol, data is transmitted between the transmitting STA 402 and the receiving STA 406. All other devices within the BSS remain inactive, not transmitting or receiving, during the time duration set by the NAV 412. These other STAs within the BSS, by also receiving the RTS/CTS packets 404/408, are instructed to remain inactive during the time duration set by the NAV 412.

In some embodiments, the first AP in the first wireless network may establish transmit opportunity (TxOP) periods corresponding to the second time slots to prevent STAs in the first wireless network from transmitting during the second time slots. That is, traffic in the first network may be suppressed during the second time slots during which traffic in the second network is scheduled to occur (e.g., the second time slots are reserved for the second wireless network). In some embodiments, suppression of traffic in the first network may be accomplished using reservations mechanisms the same as or similar to request-to-send (RTS) and clear-to-send-to-self (CTS-to-self) mechanisms defined in the current IEEE 802.11 Standard. For example, in an embodiment, the first AP of the first BSS may transmit an RTS to reserve a time period corresponding to a second time slot in which the first BSS is to remain quiet. The RTS will cause each STA in the first BSS to set a network allocation vector (NAV) and refrain from transmitting during a time period corresponding to the NAV. In this embodiment, the first AP also refrains from the transmitting during the time period corresponding to the NAV, and thus the first BSS remains quiet during the time period corresponding to the NAV.

FIG. 4 is a timing diagram of a "virtual" RTS/CTS exchange 400 that a first communication device (e.g., an AP) of a first wireless network may utilize to suppress transmissions in the first network, according to an embodiment. In this example, first communication device 402 (labeled Tx) transmits a "virtual RTS" packet 404 to a particular second communication device 406 (labeled Rx) in the first wireless network. The virtual RTS 404 may include an indication of a time period corresponding to a reservation of a wireless medium associated with the first communication network.

In response to the RTS 404, the second communication device 406 transmits a clear-to-send (CTS) packet 408. Additionally, the second communication device 406 sets a NAV 410 corresponding to the time period indicated by the RTS 404. The second communication device 406 then refrains from transmitting during the time period indicated by the NAV 410. Additionally, the first communication device 402 sets a NAV corresponding to the time period indicated by the RTS 404, and then refrains from transmitting during the time period indicated by the NAV. Similarly, in response to the RTS 404 and CTS 408 exchange, other communication devices in the first wireless network set respective NAVs corresponding to the time period indicated by the RTS 404, and then refrain from transmitting during the time period corresponding to the NAVs.

In an embodiment, the virtual RTS packet 404 is a regular RTS packet utilized during normal communications in the first wireless network (e.g., when the first wireless network is not refraining from transmissions for purposes of mitigating interference between the first wireless network and the second wireless network). For example, the virtual RTS packet 404 may conform to a legacy communication protocol (e.g., one or more of the IEEE 802.11a, the IEEE 802.11b, the IEEE 802.11g, the IEEE 802.11n, and the IEEE 802.11ac standards) at least to the extent that legacy devices (e.g., configured to operate according to the legacy communication protocol) in the first wireless network can decode the RTS packet 404 and set their NAV accordingly.

In other embodiments, the virtual RTS packet 404 includes information to distinguish the virtual RTS packet 404 from regular RTS packets. For example, in an embodiment, the virtual RTS packet 404 includes a field (e.g., one or more bits) set to a particular value to distinguish the RTS packet 404 from regular RTS packets. Thus, client devices (e.g., 25-1 . . . 25-3) may recognize the "virtual" RTS/CTS packets, due to the presence of the information. In an embodiment, "virtual" RTS/CTS packets with additional distinguishing information are configured such that legacy devices will simply interpret such "virtual" RTS/CTS packets as "ordinary" RTS/CTS packets.

Figure 5:
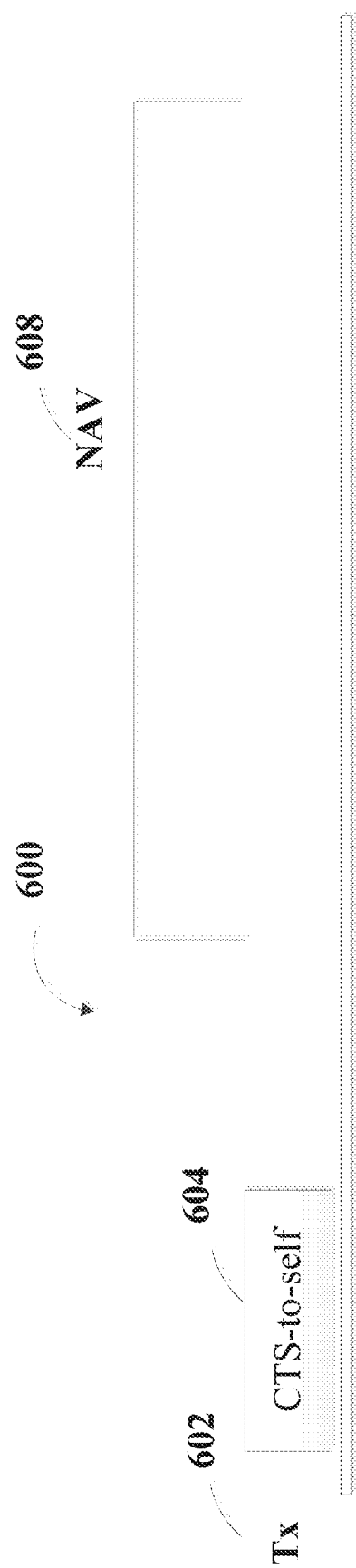
FIG. 5 is a timing diagram illustrating a clear-to-send-to-self (CTS-to-self) exchange that may be used to suppress transmissions in a first wireless network to reduce interference in a second wireless network, according to an embodiment.

FIG. 5 is a timing diagram of a "virtual" CTS-to-self transmission 600 that a first communication device (e.g., an AP) of a first wireless network may utilize to suppress transmissions in the first network, according to an embodiment. In this example, first communication device 602 (labeled Tx) transmits a "virtual CTS-to-self" packet 604 to a particular one or more second communication device in the first wireless network or broadcasts the packet 604. The virtual CTS-to-self 604 may include an indication of a time period corresponding to a reservation of a wireless medium associated with the first communication network.

The first communication device 602 sets a NAV 608 corresponding to the time period indicated by the CTS-to-self 604, and then refrains from transmitting during the time period indicated by the NAV 608. Similarly, in response to the CTS-to-self 604, other communication devices in the first wireless network set respective NAVs corresponding to the time period indicated by the CTS-to-self 604, and then refrain from transmitting during the time period corresponding to the NAVs.

In an embodiment, the virtual CTS-to-self 604 is a regular CTS-to-packet utilized during normal communications in the first wireless network (e.g., when the first wireless network is not refraining from transmissions for purposes of mitigating interference between the first wireless network and the second wireless network). For example, the virtual CTS-to-self packet 604 may conform to a legacy communication protocol (e.g., one or more of the IEEE 802.11a, the IEEE 802.11b, the IEEE 802.11g, the IEEE 802.11n, and the IEEE 802.11ac standards) at least to the extent that legacy devices (e.g., configured to operate according to the legacy communication protocol) in the first wireless network can decode the CTS-to-self packet 604 and set their NAV accordingly.

In other embodiments, the virtual CTS-to-self packet 604 includes information to distinguish the virtual CTS-to-self packet 604 from regular CTS-to-self packets. For example, in an embodiment, the virtual CTS-to-self packets 604 include a field (e.g., one or more bits) set to a particular value to distinguish the CTS-to-self packet 604 from regular CTS-to-self packets. Client devices (e.g., 25-1 . . . 25-3) may recognize the CTS-to-self packets, due to the presence of such information. In an embodiment, "virtual" CTS-to-self packets with additional distinguishing information are configured such that legacy devices will simply interpret such "virtual" CTS-to-self packets as "ordinary" CTS-to-self packets.

The above examples illustrated ways in which a first network may coordinate its traffic so as to not interfere with traffic in a second network. This may be implemented through coordination between an AP of a first network and an AP of a second network.

Figure 6A:
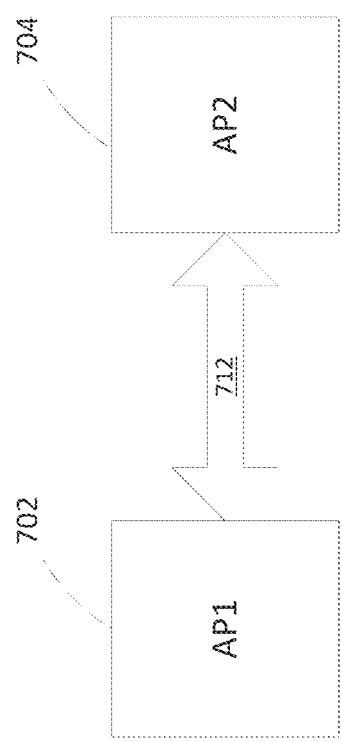
FIG. 6A is a block diagram of an example system in which access point devices coordinate transmissions to reduce interference between a first wireless network and a second wireless network, according to an embodiment.

FIG. 6A is a block diagram of an environment in which multiple APs are operating, each AP corresponding to a different WLAN, according to an embodiment. In the example of FIG. 6A, two APs 702, 704 have overlapping respective service areas. In an embodiment, AP1 702 has a structure the same or similar to the AP 14 (FIG. 1), and AP2 704 has a structure the same or similar to the AP 14 (FIG. 1).

To reduce interference between the first wireless network and the second wireless network, AP1 702 and AP2 704 coordinate as discussed above. In some embodiments, AP1 702 and AP2 704 are communicatively coupled via a communication link 112, and coordinating such as described above includes exchanging information via the communication link 112. In an embodiment, the communication link 112 is a WLAN link on a channel utilized by both the first communication network and the second communication network. In another embodiment, the communication link 112 is a WLAN link on a channel that is not utilized by either the first communication network or the second communication network. In an embodiment, the communication link 112 is separate from the first wireless network and the second wireless network. For example, in an embodiment, the communication line 112 corresponds to a wireless network separate from the first communication network and the second communication network. For example, in an embodiment, the wireless network corresponding to the link 112 operates according to a different communication protocol (e.g., long term evolution (LTE), IEEE 802.11af, IEEE 802.11ah, etc.) than utilized by either the first communication network or the second communication network. In another embodiment, the link 112 corresponds to a wired communication link or network.

Figure 6B:
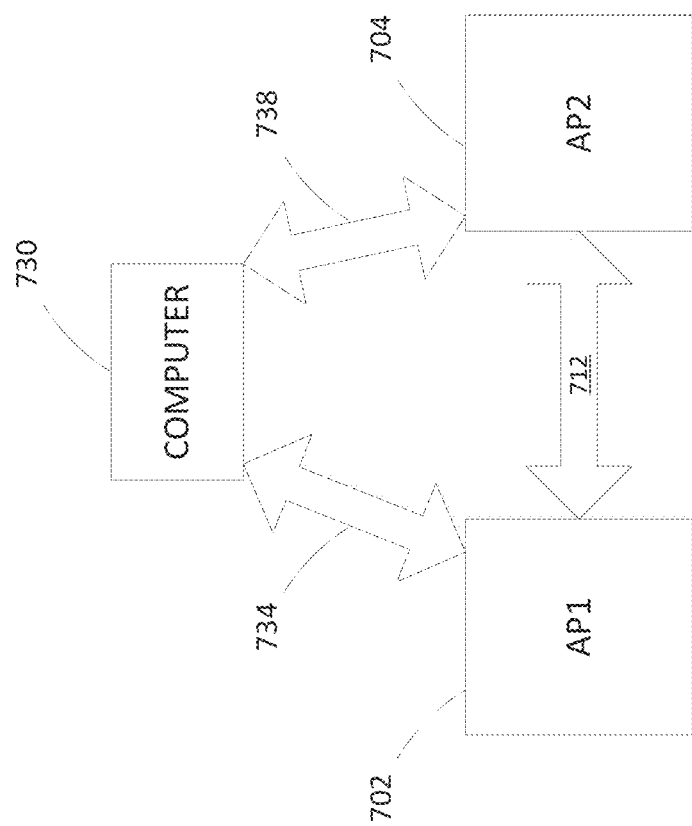
FIG. 6B is a block diagram of another example system in which a computer, alone or in combination with access point devices, coordinates transmissions to reduce interference between a first wireless network and a second wireless network, according to an embodiment.

In another embodiment, a computer (e.g., a communication device) separate from AP1 702 and AP2 704 coordinates transmissions in the first wireless network and the second wireless network for the purpose of mitigating interference between the first wireless network and the second wireless network. Turning now to FIG. 6B, in an embodiment, a computer 730 is communicatively coupled to AP1 702 via a communication link 734. Additionally, the host computer 730 is communicatively coupled to AP2 704 via a communication link 738. The computer 730 coordinates transmissions as discussed above.

In an embodiment, one or both of the communication links 734, 738 are WLAN links on a channel utilized by both the first communication network and the second communication network. In another embodiment, one or both of the communication links 734, 738 are WLAN links on a channel that is not utilized by either the first communication network or the second communication network. In an embodiment, one or both of the communication links 734, 738 are separate from the first wireless network and the second wireless network. For example, in an embodiment, one or both of the communication links 734, 738 correspond to a wireless network separate from the first communication network and the second communication network. For example, in an embodiment, one or more wireless networks corresponding to one or both of the communication links 734, 738 operate according to one or more different communication protocols (e.g., LTE, IEEE 802.11af, IEEE 802.11ah, etc.) than utilized by either the first communication network or the second communication network. In another embodiment, one or both of the communication links 734, 738 correspond to a wired communication link or network.

While two APs 702 and 704 are illustrated in FIGS. 6A and 6B, other embodiments may include different suitable numbers (e.g., 3, 4, 5, 6, etc.) of APs. In these embodiments, one or several APs may participate in coordinating transmissions for the plurality of APs.

Additionally, while one computer 730 (e.g., a communication device) is illustrated in FIG. 6B, any suitable number of computers may be used to coordinate transmissions for multiple APs.

The computer 730 may be embodied in a communication device configured to communicatively couple with AP1 702 and AP2 704. For example, the computer 730 may include or be coupled to one or more network interface devices configured to communicate with AP1 702 and AP2 704. The computer 730 may comprise a processor that executes machine readable instructions stored in a memory device of or coupled to the computer 730.

Referring again to FIG. 3, the method 300 may be implemented at least partially (e.g., alone or in combination with the AP 14) by the computer 730, according to an embodiment.

In further embodiments, a first AP or computer may determine respective presences and/or levels of interference between the first wireless network and a plurality of other wireless networks, including determining a presence of interference between the first wireless network and the second wireless network, and determining with which of the other wireless networks transmissions in the first wireless network should be coordinated.

As discussed above, the presence of interference can be detected as well as the level of the interference. As such, an AP of the first network or computer may determine with which of the other wireless networks transmissions in the first wireless network should be coordinated based on respective interference levels (or interference strengths) between the first network and the other wireless networks.

Figure 7:
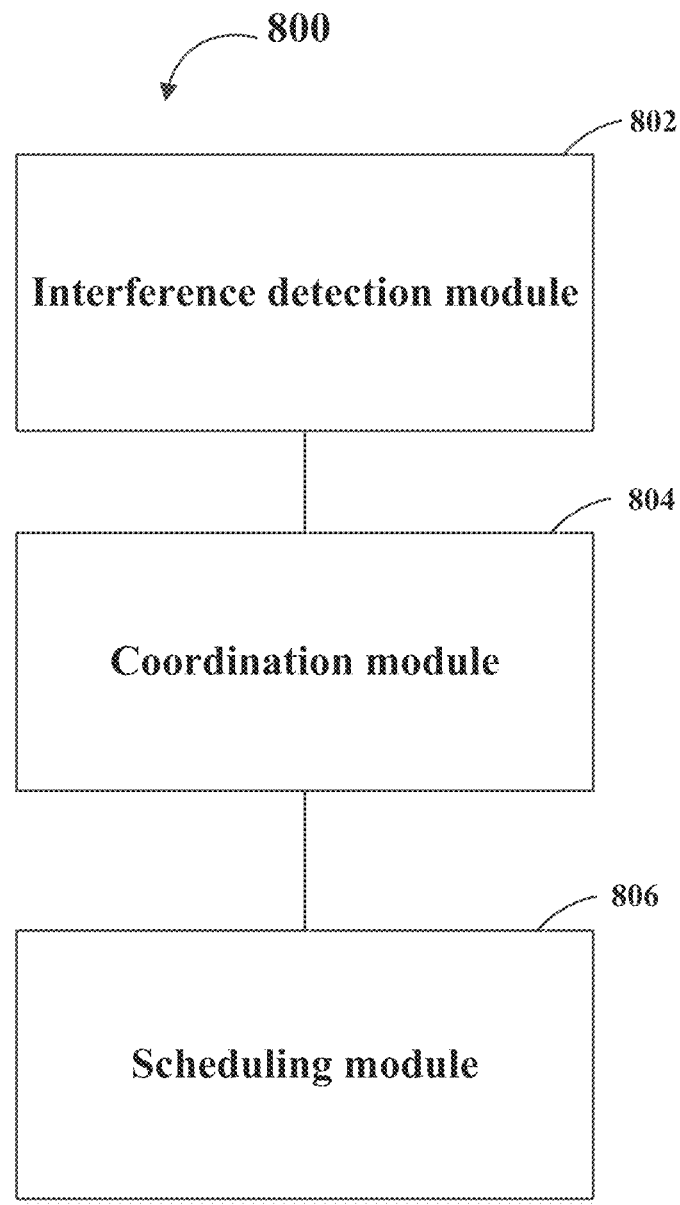
FIG. 7 is block diagram of an example apparatus configured to reduce interference in wireless communications involving two or more overlapping basic service sets (OBSSs), according to an embodiment.

FIG. 7 is a block diagram of an example apparatus 800 comprising configured to perform a method for reducing interference in wireless communications involving two or more OBSS, according to an embodiment. The apparatus 800 is included in the AP 14 (FIG. 1), according to an embodiment. For example, in an embodiment, the apparatus 800 is included in one of or any suitable combination of two or more of the host 15, the network interface 16, the MAC processing device 18, and/or the PHY processing device 20. In another embodiment, the apparatus 800 is implemented in the computer 730 (FIG. 6B). The apparatus 800 is implemented using one or more integrated circuit devices, according to some embodiments. For example, in an embodiment, the apparatus 800 is implemented in an application specific integrated circuit (ASIC), in a programmable logic device (PLD), etc. In another embodiment, the apparatus 800 is implemented in a processor configured to execute machine readable instructions stored in a non-transitory memory device.

The apparatus 800 include an interference detection module 802, a coordination module 804, and a scheduling module 806.

The interference detection module 802 may be configured to determine, a presence of interference between a first wireless network and a second wireless network. The coordination module 804 may be configured to coordinate transmissions in the first wireless network with transmissions in the second wireless network to reduce interference between the first wireless network and the second wireless network. The scheduling module 806 may be configured to schedule transmissions in the first wireless network, based on the coordinating to reduce interference between the first wireless network and the second wireless network.

In some embodiments, methods, apparatus, systems described herein are utilized with wireless networks that communicate using channels below 10 MHz. In some embodiments, methods, apparatus, systems described herein are utilized with wireless networks that communicate using channels below 10 MHz and above 1 MHz. In some embodiments, methods, apparatus, systems described herein are utilized with wireless local area networks (WLANs) that operate according to one of or any suitable combination of two or more of the IEEE 802.11a Standard, the IEEE 802.11b Standard, the IEEE 802.11g Standard, the IEEE 802.11n Standard, and/or the IEEE 802.11ac Standard. In some embodiments, methods, apparatus, systems described herein are utilized with WLANs that operate according to a suitable WLAN communication protocol other than the IEEE 802.11a Standard, the IEEE 802.11b Standard, the IEEE 802.11g Standard, the IEEE 802.11n Standard, and the IEEE 802.11ac Standard.

In further embodiments, a non-transitory computer readable storage medium having computer program instructions stored thereon is provided. The computer program instructions are such that, when executed by one or more processors, cause the one or more processors to perform a method for reducing interference in wireless communications systems as described above with reference to FIGS. 1-7.

Furthermore, further aspects of the present invention relates to one or more of the following clauses.

In an embodiment, a method for reducing interference in wireless communications is disclosed, the method including: determining, by a communication device of or communicatively coupled to a first wireless network, a presence of interference between the first wireless network and a second wireless network; coordinating, with the first communication device, transmissions in the first wireless network with transmissions in the second wireless network to reduce interference between the first wireless network and the second wireless network; and scheduling, at a first access point, transmissions in the first wireless network, based on the coordinating to reduce interference between the first wireless network and the second wireless network.

In other embodiments, the method includes one of or any suitable combination of two or more of the following elements.

Coordinating transmissions in the first wireless network with transmissions in the second wireless network includes: determining first time slots in which transmissions in the first wireless network are to occur; and determining second time slots in which transmissions in the first wireless network are not to occur.

Scheduling transmissions in the first wireless network includes establishing, with the first access point, transmit opportunity (TxOP) periods corresponding to the second time slots to prevent stations in the first wireless network from transmitting during the second time slots.

Establishing TxOP periods includes transmitting, with the first access point one or more clear-to-send-to-self (CTS-to-self) packets and/or one or more request-to-send (RTS) packets to establish the TxOP periods.

The method further includes generating the one or more RTS packets to include one or more bits to distinguish the one or more RTS packets from RTS packets not used for reducing interference with another wireless network.

The method further includes receiving, at the first access point, one or more clear-to-send (CTS) packets responsive to the one or more RTS packets, wherein the one or more CTS packets include one or more bits to distinguish the one or more CTS packets from CTS packets transmitted in response to RTS packets not used for preventing interference with another wireless network.

Determining the presence of interference includes receiving, at the first access point, a report indicating interference with the second wireless network, the report received from a station in the first wireless network. In an embodiment, the report includes an identifier of the second wireless network. In an embodiment, determining the presence of interference includes detecting, at the first access point, transmissions in the second wireless network.

The method further includes: determining, at the first access point, respective presences of interference between the first wireless network and a plurality of other wireless networks, including determining the presence of interference between the first wireless network and the second wireless network; and determining with which of the other wireless networks transmissions in the first wireless network should be coordinated.

Determining with which of the other wireless networks transmissions in the first wireless network should be coordinated, is based on respective interference levels between the first wireless network and the other wireless networks.

Determining with which of the other wireless networks transmissions in the first wireless network should be coordinated is performed at least partially at the first access point.

Determining with which of the other wireless networks transmissions in the first wireless network should be coordinated is performed jointly at the first access point and access points of the other wireless networks.

In another embodiment, an apparatus is disclosed, the apparatus including one or more integrated circuit devices configured to: determine a presence of interference between a first wireless network and a second wireless network, coordinate transmissions in the first wireless network with transmissions in the second wireless network to reduce interference between the first wireless network and the second wireless network, and schedule transmissions in the first wireless network, based on the coordinating to reduce interference between the first wireless network and the second wireless network.

In other embodiments, the apparatus comprises one of or any suitable combination of two or more of the following elements.

The one or more integrated circuit devices are further configured to determine first time slots in which transmissions in the first wireless network are to occur, and determine second time slots in which transmissions in the first wireless network are not to occur.

The one or more integrated circuit devices are further configured to establish transmit opportunity (TxOP) periods corresponding to the second time slots to prevent stations in the first wireless network from transmitting during the second time slots.

The one or more integrated circuit devices are further configured to establish TxOP periods by causing an access point of the first wireless network one or more clear-to-send-to-self (CTS-to-self) packets and/or one or more request-to-send (RTS) packets to establish the TxOP periods.

The one or more integrated circuit devices are further configured to generate the one or more RTS packets to include one or more bits to distinguish the one or more RTS packets from RTS packets not used for reducing interference with another wireless network.

The one or more integrated circuit devices are further configured to process one or more clear-to-send (CTS) packets responsive to the one or more RTS packets, and wherein the one or more CTS packets include one or more bits to distinguish the one or more CTS packets from CTS packets transmitted in response to RTS packets not used for preventing interference with another wireless network.

In yet another embodiment, a non-transitory computer readable storage medium is disclosed, the non-transitory computer readable storage medium having computer program instructions stored thereon that, when executed by one or more processors, cause the one or more processors to: determine a presence of interference between a first wireless network and a second wireless network; coordinate transmissions in the first wireless network with transmissions in the second wireless network to reduce interference between the first wireless network and the second wireless network; and schedule transmissions in the first wireless network, based on the coordinating to reduce interference between the first wireless network and the second wireless network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a magnetic tape, a RAM, a ROM, a flash memory, etc.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for reducing interference in wireless communications, the method comprising:
   determining, by a first access point of a first wireless network, a presence of interference between the first wireless network and a second wireless network served by a second access point;
   coordinating, i) at the first access point or ii) at a computer communicatively coupled to a) the first access point and b) the second access point, transmissions in the first wireless network with transmissions in the second wireless network to reduce interference between the first wireless network and the second wireless network wherein coordinating transmissions includes determining first time slots in which transmissions in the first wireless network are to occur and determining second time slots in which transmissions in the first wireless network are not to occur, wherein the first access point is not a member of the second wireless network, and wherein the second access point is not a member of the first wireless network;
   scheduling, at the first access point of the first wireless network, transmissions in the first wireless network, based on the coordinating to reduce interference between the first wireless network and the second wireless network; and
   at least one of:
   i) transmitting, with the first access point, one or more interference reduction clear-to-send-to-self (CTS-to-self) packets to establish at least some transmit opportunity periods (TxOPs) corresponding to at least some of the second time slots to prevent stations in the first wireless network from transmitting during at least some of the second time slots, wherein the one or more interference reduction CTS-to-self packets each include one or more bits to distinguish the interference reduction CTS-to-self packets from CTS packets not used for reducing interference with another wireless network, and
   ii) transmitting, with the first access point, one or more interference reduction request-to-send (RTS) packets to establish at least some TxOPs corresponding to at least some of the second time slots to prevent stations in the first wireless network from transmitting during at least some of the second time slots, wherein the one or more interference reduction RTS packets each include one or more bits to distinguish the interference reduction RTS packets from RTS packets not used for reducing interference with another wireless network.

2. The method of claim 1, further comprising receiving, at the first access point, one or more clear-to-send (CTS) packets responsive to the one or more interference reduction RTS packets, wherein the one or more CTS packets include one or more bits to distinguish the one or more CTS packets from CTS packets transmitted in response to RTS packets not used for preventing interference with another wireless network.

3. The method of claim 1, wherein determining the presence of interference comprises:
   receiving, at the first access point, a report indicating interference with the second wireless network, the report received from a station in the first wireless network.

4. The method of claim 3, wherein the report includes an identifier of the second wireless network.

5. The method of claim 1, wherein:
   determining the presence of interference comprises detecting, at the first access point, transmissions in the second wireless network.

6. The method of claim 1, further comprising:
   determining, at the first access point, respective presences of interference between the first wireless network and a plurality of other wireless networks, including determining the presence of interference between the first wireless network and the second wireless network; and
   determining with which of the other wireless networks transmissions in the first wireless network should be coordinated.

7. The method of claim 6, wherein:
   determining with which of the other wireless networks transmissions in the first wireless network should be coordinated is based on respective interference levels between the first wireless network and the other wireless networks.

8. The method of claim 7, wherein:
   determining with which of the other wireless networks transmissions in the first wireless network should be coordinated is performed at least partially at the first access point.

9. The method of claim 8, wherein:
   determining with which of the other wireless networks transmissions in the first wireless network should be coordinated is performed jointly at the first access point and access points of the other wireless networks.

10. An apparatus, comprising:
    one or more integrated circuit devices corresponding to a first access point, the one or more integrated circuit devices configured to:
    determine a presence of interference between a first wireless network served by the first access point and a second wireless network served by a second access point, wherein the first access point is not a member of the second wireless network, and wherein the second access point is not a member of the first wireless network,
    coordinate transmissions in the first wireless network with transmissions in the second wireless network to reduce interference between the first wireless network and the second wireless network, wherein coordinating transmissions includes determining first time slots in which transmissions in the first wireless network are to occur and determining second time slots in which transmissions in the first wireless network are not to occur,
    schedule transmissions in the first wireless network, based on the coordinating to reduce interference between the first wireless network and the second wireless network, and
    at least one of:
    i) cause the first access point to transmit one or more interference reduction clear-to-send-to-self (CTS-to-self) packets to establish at least some transmit opportunity periods (TxOPs) corresponding to at least some of the second time slots to prevent stations in the first wireless network from transmitting during at least some of the second time slots, wherein the one or more interference reduction CTS-to-self packets each include one or more bits to distinguish the interference reduction CTS-to-self packets from CTS packets not used for reducing interference with another wireless network, and ii) cause the first access point to transmit one or more interference reduction request-to-send (RTS) packets to establish at least some TxOPs corresponding to at least some of the second time slots to prevent stations in the first wireless network from transmitting during at least some of the second time slots, wherein the one or more interference reduction RTS packets each include one or more bits to distinguish the interference reduction RTS packets from RTS packets not used for reducing interference with another wireless network.

11. The apparatus of claim 10, wherein the one or more integrated circuit devices are further configured to:
process one or more clear-to-send (CTS) packets responsive to the one or more interference reduction RTS packets, and
wherein the one or more CTS packets include one or more bits to distinguish the one or more CTS packets from CTS packets transmitted in response to RTS packets not used for preventing interference with another wireless network.

12. A non-transitory computer readable storage medium having computer program instructions stored thereon that, when executed by one or more processors corresponding to a first access point, cause the one or more processors to:
determine a presence of interference between a first wireless network served by the first access point and a second wireless network served by a second access point, wherein the first access point is not a member of the second wireless network, and wherein the second access point is not a member of the first wireless network;
coordinate transmissions in the first wireless network with transmissions in the second wireless network to reduce interference between the first wireless network and the second wireless network, wherein coordinating transmissions includes determining first time slots in which transmissions in the first wireless network are to occur and determining second time slots in which transmissions in the first wireless network are not to occur;
schedule transmissions in the first wireless network, based on the coordinating to reduce interference between the first wireless network and the second wireless network; and
at least one of:
i) cause the first access point to transmit one or more interference reduction clear-to-send-to-self (CTS-to-self) packets to establish at least some transmit opportunity periods (TxOPs) corresponding to at least some of the second time slots to prevent stations in the first wireless network from transmitting during at least some of the second time slots, wherein the one or more interference reduction CTS-to-self packets each include one or more bits to distinguish the interference reduction CTS-to-self packets from CTS packets not used for reducing interference with another wireless network, and
ii) cause the first access point to transmit one or more interference reduction request-to-send (RTS) packets to establish at least some TxOPs corresponding to at least some of the second time slots to prevent stations in the first wireless network from transmitting during at least some of the second time slots, wherein the one or more interference reduction RTS packets each include one or more bits to distinguish the interference reduction RTS packets from RTS packets not used for reducing interference with another wireless network.

\* \* \* \* \*